United States Patent [19]
Balk et al.

[11] Patent Number: 6,051,616
[45] Date of Patent: Apr. 18, 2000

[54] PREPARING POLYMER DISPERSION FOAMS

[75] Inventors: Roelof Balk, Böhl-Iggelheim; Onno Graalmann, Dossenheim, both of Germany; Frank Kolman, Duiven, Netherlands

[73] Assignee: BASF Aktiengesellschaft, Ludwigshafen, Germany

[21] Appl. No.: 09/218,152

[22] Filed: Dec. 22, 1998

[30] Foreign Application Priority Data

Dec. 23, 1997 [DE] Germany .................... 197 57 700

[51] Int. Cl.⁷ .................. C08J 9/18; C08J 9/20; C08J 9/22
[52] U.S. Cl. .................. 521/56; 521/60
[58] Field of Search .................. 521/56, 60

[56] References Cited

U.S. PATENT DOCUMENTS

| | | |
|---|---|---|
| 4,269,749 | 5/1981 | Marriott et al. . |
| 4,870,112 | 9/1989 | Knipp et al. . |
| 5,510,399 | 4/1996 | Sauer . |
| 5,667,368 | 9/1997 | Dunn et al. . |

FOREIGN PATENT DOCUMENTS

| | | |
|---|---|---|
| 661296 | of 0000 | European Pat. Off. . |
| 0 248 162 | 12/1987 | European Pat. Off. . |
| 0 536 597 | 4/1993 | European Pat. Off. . |
| 2101650 | of 0000 | Germany . |
| 144 415 | 10/1980 | Germany . |
| 976212 | 11/1964 | United Kingdom . |
| 1319784 | 6/1973 | United Kingdom . |

OTHER PUBLICATIONS

B. D. Jones, Institution of the Rubber Industry, pp. 485–497, "New Method for the Production of Improved SBR High Solids Latices", May 22nd to 25th, 1962.

Von W. Scholtan, et al., Kolloid–Z u. Z. Polymere, vol. 250, pp. 782–796, "Bestimmung Der Teilchengroessenverteilung Von Latices Mit Der Ultrazentrifuge", Jun. 30, 1972.

Walter Maechtle, Angew. Makromol. Chem., vol. 162, pp. 35–52, "Coupling Particle Size Distribution Technique", Mar. 30, 1988.

Walter Maechtle, Makromol. Chem., vol. 185, pp. 1025–1039, "Charakterisierung Von Dispersionen Durch Gekoppelte $H_2O/D_2O$–Ultrazentrifugenmessungen$^{a)}$", Oct. 13, 1983.

*Primary Examiner*—Morton Foelak
*Attorney, Agent, or Firm*—Oblon, Spivak, McClelland, Maier & Neustadt, P.C.

[57] ABSTRACT

The present invention relates to a process for preparing a polymer dispersion foam L, where:

a) a mixture M which comprises at least one conjugated diene monomer A and at least one ethylenically unsaturated comonomer B is polymerized by free-radical aqueous emulsion polymerization in the presence of at least one emulsifier to give a fine polymer dispersion P, b) the fine polymer dispersion P is pressure-agglomerated to give a coarse polymer dispersion G, c) the polymer dispersion G is concentrated, if desired, and is mixed, if desired, with a reinforcer dispersion H, and d) the dispersion from c) is foamed to give a polymer dispersion foam L, which comprises adjusting the average particle size and the particle size distribution of G by varying a parameter selected from:

I) the solids content of P,
    II) the agglomeration temperature in step b),
    III) the agglomeration pressure in step b),
    IV) the content of comonomer B in the mixture M,
    V) the concentration of the emulsifier in P,
    VI) the agglomeration throughput, to polymer dispersion foams obtainable by this process and to their use.

15 Claims, No Drawings

PREPARING POLYMER DISPERSION FOAMS

The present invention relates to a process for preparing polymer dispersion foams, where a fine polymer dispersion obtainable by free-radical aqueous emulsion polymerization is subjected to pressure agglomeration, then, if desired, to concentration and, if desired, to mixing with a reinforcer dispersion, and foamed to give a polymer dispersion foam. The invention also relates to the agglomerated polymer dispersions obtainable in this way and to the polymer dispersion foams and their use.

Owing to their special product properties, such as good elasticity and long life, polymer dispersion foams have found broad application, in particular as molding foams for upholstery materials in the furniture and automotive industries, and as carpeting foams for the coating of carpet backings. To prepare such polymer dispersion foams, it is common to use an aqueous polymer dispersion based on a diene monomer and, in particular, on butadiene. In order to produce stable foams having good product properties, these dispersions must be of high solids content but comparatively low viscosity. In order to achieve this, a portion of the particles in such polymer dispersions must be relatively large and the size distributions must be relatively broad. Since diene monomers, such as butadiene, however, are fairly unreactive and only polymerize slowly, highly concentrated aqueous butadiene dispersions with a solids content of at least 60% by weight cannot be prepared economically by direct emulsion polymerization. Thus it is usual first to prepare fine polymer dispersions having a relatively low solids content and a particle size in the range from about 50 to 100 nm and then to convert them by agglomeration into coarse dispersions having a broad particle size distribution. Such dispersions can then be concentrated by removal of water and, if desired, can also be mixed with a hard reinforcer dispersion.

Known techniques for agglomerating polymer dispersions include pressure, freeze and chemical agglomeration. In freeze agglomeration, the dispersions are frozen in layers, producing partial colloidal instability which leads to clustering of the polymer dispersion particles, and are subsequently thawed. However, this technique is very complex in technical terms and is associated with high energy costs.

In the case of chemical agglomeration, an agglomerant such as a polyalkylene oxide, for example, is added to the fine polymer dispersions in order to initiate a process of controlled agglomeration. EP-A-661 296 describes a process for preparing aqueous, highly concentrated synthetic rubber dispersions by chemical agglomeration of fine initial dispersions with the aid of water-soluble or water-dispersible copolymers which comprise hydrophobic, water-insoluble, olefinically unsaturated monomers and hydrophilic, water-soluble and salt-forming, olefinically unsaturated monomers. Disadvantages of this technique are that in some cases the agglomerant first has to be prepared and that said agglomerant must subsequently be added to the polymer dispersion, together with an electrolyte solution, with continuous precise monitoring of the surface tension and/or of the pH.

In "New Method for the Production of Improved SBR High Solids Latices" on the occasion of the Fourth Rubber Technology Conference, London, 1962, B. D. Jones reported on new processes for preparing synthetic polymer dispersions of high solids content, and specifically a process for agglomerating SBR polymer dispersions to give polymer dispersions having an improved relationship between solids content and viscosity. In this process, the synthetic rubber dispersions are pressure-agglomerated in a homogenizer in the presence of emulsifiers and at a pH of up to 13. By an appropriate choice of the process parameters, such as pH, temperature and solids content of the polymer dispersion to be agglomerated, pressure of homogenization and the proportion of soap (emulsifier) to rubber, it is possible to obtain synthetic rubber dispersions with a solids content of up to 76% and a viscosity of 2000 mPa.s. At the same time, there is only minor formation of coagulum. The publication gives only a general description of the effect of different process parameters on a pressure agglomeration process. Regulation of the average particle size and of the particle size distribution, i.e. of the particle morphology of the agglomerated polymer dispersions, by varying a single parameter in the course of agglomeration is not described, nor is the influence of particle morphology on the final polymer dispersion foam product.

GB-A-976 212 describes a process for reducing the viscosity and/or enlarging the particle size of a synthetic rubber dispersion obtained by emulsion polymerization, in which the polymer dispersion is caused to flow through a stricture at increased pressure.

DE-A-2101650 describes rubber dispersions which are obtainable by agglomerating an initial dispersion having an average particle size of less than 0.15 $\mu$m, where not more than 30% of the particles have a diameter of less than 0.10 $\mu$m, a process for their preparation, and their use. The preparation process on which they are based is highly complex in technical terms, since some of the particles of the initial rubber dispersion, with a particle diameter of less than 0.1 $\mu$m, must be removed by centrifuging and creaming prior to the agglomeration.

A disadvantage of the processes described above is that controlling the process to give a certain quality profile in the polymer dispersion as end product is very complex. In particular, even when using only one specific fine initial dispersion, it is always necessary to match a number of process parameters to one another in the course of agglomeration if different foams having different product properties are to be prepared from this one dispersion. This often involves laborious testing for the appropriate reaction conditions in the case of a product changeover, which is expensive in terms of material and time and impacts adversely on the economics of the process.

It is an object of the present invention to provide a process for preparing polymer dispersion foams, where a fine initial polymer dispersion is pressure-agglomerated to form a coarse polymer dispersion which is subsequently foamed, and where the disadvantages described above in connection with the establishment of the process parameters of the pressure agglomeration are avoided. Said process should permit the very simple and economic preparation of coarse polymer dispersions having different product properties for further processing to polymer dispersion foams having different quality profiles.

We have found that this object is achieved if, depending on the desired product properties of the polymer dispersion foam, in each case one of three specific parameters is varied in the course of the agglomeration of the fine initial dispersions. We have also found that these parameters have an influence on the particle size distribution of the coarse agglomerated polymer dispersion, and that said distribution in turn substantially affects the morphology of the polymer dispersion foam as end product and hence its product properties, such as the hardness properties and tear properties, for example.

The invention hence provides a process for preparing polymer dispersion foams L, where:

a) a mixture M which comprises at least one conjugated diene monomer A and at least one ethylenically unsaturated comonomer B is polymerized by free-radical aqueous emulsion polymerization in the presence of at least one emulsifier to give a fine polymer dispersion P, b) the fine polymer dispersion P is pressure-agglomerated to give a coarse polymer dispersion G, c) the polymer dispersion G is concentrated, if desired, and is mixed, if desired, with a reinforcer dispersion H, and d) the dispersion from c) is foamed to give a polymer dispersion foam L, which comprises adjusting the average particle size and the particle size distribution of G by varying a parameter selected from:

I) the solids content of P,

II) the agglomeration temperature in step b),

III) the agglomeration pressure in step b),

IV) the content of comonomer B in the mixture M,

V) the concentration of the emulsifier in P,

VI) the agglomeration throughput.

Step a

The fine polymer dispersions P are prepared by free-radical aqueous emulsion polymerization in accordance with customary techniques, including feed techniques, semicontinuous feed techniques and batch techniques. The semicontinuous procedure is preferred, in which the monomers in pure or pre-emulsified form and together with the polymerization medium and at least one emulsifier are charged to a reactor and with the addition of an initiator are polymerized, preferably without formation of a seed latex beforehand. In this context, the initiator may also be included in part in the initial charge or supplied to the polymerization reactor completely by way of a feed stream at the rate at which it is consumed for maintaining the polymerization.

The polymerization medium may consist either of water alone or of mixtures of water and water-miscible liquids, such as methanol. Preferably, water alone is used.

The free-radical aqueous emulsion polymerization can be carried out under atmospheric pressure, superatmospheric pressure or subatmospheric pressure. Especially when using gaseous monomers such as butadiene, for example, the polymerization can be carried out under superatmospheric pressure.

The polymerization temperature is generally from 0 to 100° C. Higher polymerization temperatures of up to 130° C., for example, are possible. Preferably, however, the polymerization temperature of the process of the invention lies at lower levels of from about 0 to 50° C., preferably from about 0 to 30° C.

To prepare the fine polymer dispersions P, emulsifiers and/or protective colloids are added to the polymerization batch in an amount of from 0.05 to 15% by weight, preferably from 1 to 10% by weight, based on the monomer amount.

Suitable emulsifiers are those which are known to the skilled worker and which are commonly employed as dispersants in the context of aqueous emulsion polymerization; such emulsifiers are described, for example, in Houben-Weyl, Methoden der organischen Chemie, volume XIV/1, Makromolekulare Stoffe [Macromolecular substances], Georg-Thieme-Verlag, Stuttgart, 1961, pp. 411–420. Anionic, cationic and nonionic emulsifiers are suitable.

Preference is given to using anionic emulsifiers and, in particular, soaps.

Suitable anionic emulsifiers are the salts of $C_8$–$C_{18}$ fatty acids with alkali metals, such as Na and K, with ammonium, with volatile amines, such as triethylamine, ethanolamine, diethanolamine, triethanolamine, morpholine, etc., and with divalent and trivalent cations, such as calcium, magnesium, aluminum, for example. Examples of further suitable anionic emulsifiers are alkali metal and ammonium salts of alkyl sulfates (alkyl: $C_8$–$C_{22}$), of sulfuric monoesters of ethoxylated alkanols (EO units: 2 to 50, alkyl: $C_{12}$–$C_{18}$) and ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$–$C_{18}$). Further suitable emulsifiers are given in Houben-Weyl, op. cit., pp. 192–208. Likewise suitable as anionic emulsifiers are bis(phenoylsulfonic acid) ethers and/or their alkali metal or ammonium salts which carry $C_4$–$C_{24}$-alkyl on one or both aromatic rings. These compounds are well known, for example, from U.S. Pat. No. 4,269,749, and are obtainable commercially, as, for example, Dowfax® 2A1 (Dow Chemical Company).

Preferred emulsifiers for the process of the invention are the sodium or potassium soaps of palmitic, margaric, stearic, palmitoleic and oleic acids and resin soaps (resinates), such as the sodium or potassium salts of ricinoleic, abietic and pimaric acid, etc.

The emulsifiers employed must be compatible with apolar particles and must be able to desorb rapidly. Since the proportion of soap to polymer may also influence the properties of the end product, the surface tension of the polymerized fine dispersions P should in general be not more than 70 mN/m. In order to obtain sufficient covering of the particles, the amount in which soaps are employed as emulsifiers is generally from about 1 to 10% by weight, based on the amount of monomers to be polymerized.

If desired, the monomer mixture can be polymerized in the presence of electrolytes such as alkali metal chlorides and alkali metal sulfates, e.g. KCl and $Na_2SO_4$. This addition of electrolyte brings about preagglomeration of the polymer dispersion particles, so that there is not too sharp an increase in the viscosity of the polymer dispersions P.

Suitable protective colloids are the stable protective colloids customary for the preferably alkaline pH of the dispersions of the invention. A detailed description of protective colloids is given in Houben-Weyl, op. cit., pp. 411–420. Protective colloids suitable for preparing polymer dispersions P are phenol- and naphthalenesulfonic acid-formaldehyde condensates, such as the Tamol® grades from BASF AG, for example. The amount employed is generally from about 0.1 to 2% by weight, based on the overall amount of monomers to be polymerized.

Polymerization initiators that can be employed are all compounds which dissociate into free radicals under the polymerization conditions, examples being peroxides, hydroperoxides, hydrogen peroxide, persulfates, azo compounds and what are known as redox catalysts. Preference is given to the use of water-soluble initiators. In some cases it is advantageous to use mixtures of different polymerization initiators; for example, mixtures of hydrogen peroxide with sodium or potassium peroxodisulfate.

Mixtures of hydrogen peroxide and sodium peroxodisulfate can be used in any desired proportion. Organic peroxides likewise suitable as initiators are described in EP-A-0 536 597. Said polymerization initiators are employed in customary amounts of, for example, from 0.01 to 5% by weight, preferably from 0.1 to 2.0% by weight, based on the monomers to be polymerized.

It is preferred to employ initiators which are able to initiate the polymerization even at low temperatures such as from about 0 to 50° C., preferably from about 10 to 30° C. For polymerizations, especially at low temperatures, it is preferable to employ redox initiators which comprise at least one reducing agent and one oxidizing agent. Suitable oxidizing agents in such systems are the abovementioned peroxides and/or hydroperoxides. Preference is given to combined systems, which may also include a small amount of a metal compound which is soluble in the polymerization medium and is able to exist in a plurality of valence states. Suitable redox initiator systems for the process of the invention include as their reducing component, for example, ascorbic acid, glucose, sorbose, an ammonium or alkali metal hydrogensulfite, sulfite, thiosulfate, hyposulfite, pyrosulfite or sulfide, salts of hydroxymethanesulfinic acid, preferably the sodium salt, obtainable as Rongalit® from BASF AG, acetone bisulfite adducts, etc.

Suitable oxidizing components are hydrogen peroxides, tert-butyl hydroperoxide, diisopropyl hydroperoxide, ammonium and/or alkali metal peroxodisulfates, etc. Suitable metallic components are water-soluble Fe(II) salts, such as Fe(II) sulfate, silver salts, and combinations of water-soluble Fe/V salts, etc.

Preferred redox initiators are:
diisopropyl hydroperoxide/acetone bisulfite adduct,
diisopropyl hydroperoxide/sodium hydroxymethanesulfinate,
ascorbic acid/Fe(II) sulfate/hydrogen peroxide.

If redox initiators are employed as the initiator systems, the amount of the reducing component is generally from about $3 \times 10^{-6}$ to 1 mol % and that of the oxidizing component is generally from about 0.001 to 5.0 mol %, based on the amount of monomers employed for the polymerization.

The monomer mixture M used to prepare the polymer dispersions P comprises from 45 to 99% by weight, preferably from 50 to 90% by weight and, in particular, from 55 to 85% by weight of at least one free-radically polymerizable diene monomer A (principal monomer) and from 1 to 55% by weight of at least one comonomer B.

Suitable diene monomers A are butadiene, isoprene, chloroprene and mixtures thereof.

It is particularly preferable to employ butadiene as the diene monomer A.

Suitable ethylenically unsaturated comonomers B are vinylaromatic comopunds, such as styrene, α-methylstyrene, o-chlorostyrene or vinyltoluene, esters of α,β-monoethylenically unsaturated $C_3$–$C_6$ mono- and dicarboxylic acids with alkanols having preferably 1 to 12 carbon atoms, particularly preferably 1 to 8 carbon atoms, such as esters of acrylic acid and/or methacrylic acid with methanol, ethanol, n-propanol, isopropanol, n-butanol, isobutanol and 2-ethylhexanol, esters of vinyl alcohol with monocarboxylic acids having 1 to 20 carbon atoms, such as vinyl formate, vinyl acetate, vinyl propionate, vinyl n-butyrate, vinyl laurate and vinyl stearate, α,β-ethylenically unsaturated nitriles, such as acrylonitrile and methacrylonitrile, $C_3$–$C_6$ α,β-monoethylenically unsaturated mono- and -dicarboxylic acids and their amides, such as acrylic acid, methacrylic acid, maleic acid, fumaric acid, itaconic acid, acrylamide and methacrylamide, for example.

Monomers which normally increase the internal strength of the aqueous polymer dispersion are generally incorporated in the polymerization only in minor amounts, usually from 0.5 to 10% by weight based on the overall amount of monomers to be polymerized. Monomers of this kind normally have an epoxy, hydroxyl, N-methylol or carbonyl group or at least two nonconjugated ethylenicallly unsaturated double bonds. Examples thereof are N-alkylolamides of $C_3$–$C_{10}$ α,β-monoethylenically unsaturated carboxylic acids and their esters with $C_1$–$C_4$ alcohols, among which N-methylolacrylamide and N-methylolmethacrylamide are very particularly preferred, silanized monomers, such as γ-methacryloxypropylsilane or vinyltrimethoxysilane, monomers having two vinyl radicals, monomers having two vinylidene radicals, and monomers having two alkenyl radicals. Particularly suitable in this context are the diesters of dihydric alcohols with α,β-monoethylenically unsaturated monocarboxylic acids, preference being given in turn among these to the use of acrylic acid and methacrylic acid. Examples of monomers of this kind having two nonconjugated ethylenically unsaturated double bonds are the alkylene glycol diacrylates and dimethacrylates, such as ethylene glycol diacrylate, 1,3-butylene glycol diacrylate, 1,4-butylene glycol diacrylate and also propylene glycol diacrylate, divinylbenzene, vinylmethacrylate, vinyl acrylate, allyl methacrylate, allyl acrylate, diallyl maleate, diallyl fumarate, methylenebisacrylamide, cyclopentadienyl acrylate and triallyl cyanurate. Also of particular importance in this context are the $C_1$–$C_8$ hydroxyalkyl esters of acrylic and methacrylic acid, such as n-hydroxyethyl, n-hydroxypropyl or n-hydroxybutyl acrylates and methacrylates, and compounds such as diacetoneacrylamide and acetylacetoxyethyl acrylate or methacrylate.

In a preferred embodiment of the process of the invention the monomer mixture M for preparing the polymer dispersions P comprises butadiene as diene monomer A and a comonomer B selected from vinylaromatic compounds, preferably styrene, (meth)acrylic esters, preferably methyl methacrylate, and acrylonitrile. The amount of A employed is then from 55 to 90% by weight, preferably from 55 to 85% by weight and, in particular, from 60 to 80% by weight, based on the overall amount of the monomers of M.

If desired, the monomer mixture M can be polymerized in the presence of customary polymerization regulators. In this case these regulators are used in an amount of from about 0.01 to 5% by weight, based on the overall amount of the monomers to be polymerized.

Suitable regulators are compounds which when used in polymerizations limit the molecular weight of the polymers: examples are alcohols, salts of hydrazine and of hydroxylamine, formic acid, alkali metal and ammonium salts of formic acid, organic compounds containing sulfur in bonded form, such as organic sulfides, disulfides, polysulfides, sulfoxides, sulfones and mercapto compounds, ammonia and amino compounds, or mixtures thereof. Specific examples of polymerization regulators are: di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, diethanol sulfide, di-t-butyl trisulfide and dimethyl sulfoxide, ethanolamine, diethanolamine, triethanolamine, triethylamine, morpholine and piperidine. Compounds preferably employed as polymerization regulators are mercapto compounds, dialkyl sulfides and/or diaryl sulfides. Examples of these compounds are ethyl thioglycolate, cysteine, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioglycerol, thioacetic acid, thiourea and alkyl mercaptans, such as n-butyl, n-hexyl or n-dodecyl mercaptan.

Further customary additives in the case of free-radical aqueous emulsion polymerization for the preparation of the polymer dispersions P are oxygen scavengers, such as dithionites, for example.

A chain-terminating reagent may be added if desired to the polymerization batch in order to limit the maximum conversion. In contrast to the regulators, the compounds employed as chain-terminating reagents are those whose free radicals are so slow to react that in general they are unable to initiate chain reactions. Examples of such reagents include alkylphenols, amines, such as diethylhydroxylamine, sulfites, disulfites, etc.

The abovementioned, and also customary, additives can be added to the polymer dispersions P in the initial charge, in one of the feed streams, or after the end of polymerization. For instance, the pH of the dispersion can be adjusted, if desired, by means of acids or, preferably, bases, examples being alkali metal hydroxides, alkali metal carbonates, alkali metal phosphates, alkali metal acetates, ammonia, etc. Examples of further suitable additives are reducing agents and bleaching agents, such as the alkali metal salts of hydroxymethanesulfinic acid (e.g. Rongalit® from BASF AG).

Further additives which are frequently added to the polymer dispersions following polymerization are stabilizers. Examples of suitable stabilizers are complexing agents, such as EDTA or nitrilotriacetic acid.

The pH of the polymer dispersions P is preferably in the alkaline range, such as from about 9 to 12, especially about 10, for example.

The polymerization period is generally from about 5 to 20 hours.

In the case of the present process for preparing the polymer dispersions P, polymerization is generally conducted to a monomer conversion of from about 60 to 100%, preferably from about 70 to 90%. The residual monomer content of the dispersions can be reduced by customary techniques, preferably by stripping, for example with steam. The techniques to be employed in this case are those which do not lead to further polymerization or crosslinking.

The particle size distribution of the polymer dispersions P obtained by the process of the invention is in general virtually monomodal, with a relatively narrow size distribution. The LT (light transmittance, measured against water) is generally from about 70 to 98%, preferably from 75 to 98% and, in particular, from 80 to 95%.

The weight-average particle size as determined by means of an analytical ultracentrifuge in accordance with the method of W. Scholtan and H. Lange, Kolloid-Z. und Z. Polymere 250 (1972) 782–796 (see also W. P. Mächtle, Angewandte makromolekulare Chemie 162 (1988) 35–42) gives a ponderal median particle diameter $d_{50}$ of from 30 to 120 nm, preferably from 40 to 100 nm. The $d_{90}$ value is from about 70 to 200 nm, preferably from 90 to 180 nm.

Step b

The agglomeration of the fine polymer dispersions P described above to give coarse polymer dispersions G takes place by customary techniques, known to the skilled worker, as pressure homo- or pressure coagglomeration. By pressure coagglomeration is meant on the one hand the simultaneous use of pressure and further process measures, such as freezing or the addition of chemical agglomerants, to obtain the agglomeration of the polymer dispersion particles, and also, on the other hand, the mixing of at least two different dispersions and their conjoint agglomeration.

The process of the invention preferably employs pressure homoagglomeration. For this purpose, for example, the dispersion P is forced at high pressure through a valve or stricture, in the course of which the particles of the polymer dispersion agglomerate. The pressures which arise in this process are within a range from about 100 to 450 bar. Also suitable for the pressure agglomeration are generally known techniques and apparatus which allow the action of shear forces. These include, for example, in-line mixers and stirrers.

As has been explained, it was surprisingly found that the average particle size and the particle size distribution of the agglomerated dispersions G critically influenced the properties of the polymer dispersion foams L prepared therefrom in the subsequent steps c) and d). This applies in general both for the morphology and for certain mechanical properties of the foams and vulcanisates prepared therefrom, such as, for example, their hardness and tear properties.

Employing the process of the invention it is possible advantageously, from an initial dispersion P having defined constant properties, to prepare polymer dispersion foams having different product properties of good quality. In the preparation of the coarse polymer dispersions G for these foams L having different properties it is necessary in each case to adjust only one (single) process parameter selected from:

I) the solids content of P,
II) the agglomeration temperature in step b),
III) the agglomeration pressure in step b),
IV) the content of comonomer B in the mixture M,
V) the concentration of the emulsifier in P,
VI) the throughput during agglomeration.

I) The solids content of the fine polymer dispersion P is generally within a range from about 25 to 55% by weight, preferably from 30 to 55% by weight, and can as described below be varied as a function of the desired properties of the coarse polymer dispersion G and of the resulting polymer dispersion foams L.

II) The agglomeration temperature is generally within a range from about 0 to 45° C., preferably from 5 to 40° C., and can, as described below, be varied likewise as a function of the desired properties of the coarse polymer dispersions G and of the resulting polymer dispersion foams L.

III) The agglomeration pressure is in general within a range from about 100 to 450 bar, such as from 150 to 400 bar, and can, for example, be from 175 to 325 bar.

IV) The content of the comonomer B in the mixture M is generally from about 1 to 55% by weight, preferably from about 10 to 50% by weight, and can, as described below, be varied likewise as a function of the desired properties of the coarse polymer dispersions G and of the resulting polymer dispersion foams L.

V) The concentration of the emulsifier in the fine polymer dispersion P which is to be agglomerated is, as described above, from about 1 to 10% by weight, based on the amount of monomers to be polymerized, with the surface tension being not more than 70 mN/m. The process of agglothration reduces the total surface area of the polymer dispersion particles; soap coverage of the polymer dispersion particles increases, and the surface tension is generally lowered. The surface tension of the agglomerated, coarse polymer dispersions G is within a range from about 25 to 45 mN/m, preferably from 30 to 40 mN/m. If desired, emulsifier can also be added to the polymer dispersion in the course of agglomeration.

VI) The throughput during agglomeration depends on the type of pump used and can in general easily be 9000 l/h.

The particle size distribution of the coarse polymer dispersion G is in general relatively broad. It can be between 40 and 2500 nm.

The ponderal median particle size of the coarse polymer dispersion G, determined by means of an analytical ultracentrifuge, is—irrespective of the quality profile of the polymer dispersion foam prepared therefrom—for the $d_{50}$ value within a range from about 50 to 1000 nm, preferably from 80 to 800 nm. The $d_{90}$ value is within a range from about 350 to 2600 nm, preferably from 450 to 2500 nm.

In a preferred embodiment of the process of the invention the coarse polymer dispersions G prepared are used as intermediates for polymer dispersion foams L whose properties are targeted toward a utility as molding foams.

In this case, agglomeration is carried out using fine polymer dispersions P having a solids content of from about 30 to 55% by weight, preferably from about 30 to 40% by weight. The agglomeration temperature is within a range from about 5 to 40° C., preferably from about 15 to 40° C. The content of comonomer B in the mixture M is generally from about 10 to 50% by weight, preferably from 10 to 35% by weight.

The LT value of the agglomerated polymer dispersions G for further processing to molding foams is in general from about 5 to 30%.

The ponderal median particle diameter of the agglomerated polymer dispersions G for further processing to molding foams, measured as the $d_{50}$ value in the analytical ultracentrifuge, is generally from about 80 to 800 nm. The ponderal median particle diameter measured as the $d_{90}$ value is generally from about 400 to 1600 nm.

In a further preferred version, the coarse polymer dispersions G prepared are used as intermediates for polymer dispersion foams L whose properties are targeted toward a utility as carpeting foams.

In this case, agglomeration is carried out using fine polymer dispersions P having a solids content of from about 30 to 55% by weight, preferably from about 35 to 55% by weight. The agglomereration temperature is then in general within a range from about 5 to 35° C., preferably from 5 to 30° C. The content of comonomer B in the mixture M is generally from about 15 to 55% by weight, preferably from 20 to 55% by weight.

The LT value of the resulting agglomerated polymer dispersions G for further processing to carpeting foams is generally from about 3 to 25, preferably from about 3 to 15.

The ponderal median particle diameter of the polymer dispersions G for further processing to carpeting foams, measured as the $d_{50}$ value in the analytical ultracentrifuge, is in general from about 150 to 1500 nm.

The ponderal median particle diameter of the polymer dispersions G for further processing to carpeting foams, measured as the $d_{90}$ value in the analytical ultracentrifuge, is in general from about 600 to 2500 nm.

The coarse polymer dispersions G obtained by agglomeration therefore have a particle size distribution which is tailored to the desired properties of the end product.

Step c

Polymer dispersion foams are prepared using coarse polymer dispersions G having a high solids content, which is generally at least 60% by weight, preferably 65% by weight and, in particular, more than 65% by weight. For this purpose the dispersions obtained in step b) are concentrated in a conventional manner:

for example, by thin-film evaporation. However, in the course of such concentration it is important not to exceed a level of viscosity which is still acceptable for further processing. The concentrated dispersions obtainable from the process of the invention generally have a viscosity of from about 1000 to 2500 mPa.s, measured by the Brookfield method. The surface tension is within a range from about 25 to 50 mN/m.

In order to obtain greater hardness of the polymer dispersion foam L, the highly concentrated polymer dispersions can, if desired, be blended with a reinforcer dispersion, prior to or during concentration or prior to foaming. In this case the reinforcer dispersion employed must be compatible with the highly concentrated polymer dispersion; in other words, the prevailing pH of each must be comparable, and the emulsifier systems present must be compatible with one another.

The reinforcer dispersions H which are employed in the process of the invention comprise in copolymerized form at least one ethylenically unsaturated monomer selected from vinylaromatic compounds, preferably styrene, vinyl halides, preferably vinyl chloride, nonaromatic hydrocarbons having at least two olefinic double bonds, preferably butadiene, and mixtures thereof.

The reinforcer dispersions H are preferably selected from styrene homopolymers, styrene-butadiene copolymers and polyvinyl chloride homopolymers. Where butadiene and styrene are employed as monomers for the mixture M for preparing the fine polymer dispersions P, and where these dispersions are mixed with such a dispersion following agglomeration and concentration, the products obtained are materially homogeneous.

The average particle size of the reinforcer dispersions H is in general from about 25 to 220 nm, preferably from about 50 to 200 nm. The particle size distribution here is monomodal or polymodal.

Step d

The highly concentrated synthetic rubber dispersions described above are equally suitable for all current techniques for preparing polymer dispersion foams. Such techniques are known to the skilled worker and include, for example, the mechanical foaming of the polymer dispersions with air or other blowing gases and, if desired, their subsequent hot vulcanization. For foam production, the polymer dispersion can be compounded.

To this end, crosslinking or vulcanizing agents are generally added to the rubber dispersion. Agents of this type are known to the skilled worker from, for example, E. W. Madge 'Latex Foam Rubber', Maclaren & Sons, 1962 or W. Hofmann, Rubber Technology Handbook, Carl Hanser Verlag, Munich, Vienna, New York and Oxford University Press. It is common to use a sulfur-based crosslinking system whose sulfur content is generally from 2 to 3% by weight (dry weight). Accelerators, such as dithiocarbamate, xanthate, thiazole or thiuram, can likewise be added. If desired, zinc oxide is added in amounts from 1 to 10% by weight as an activator at the compounding or foaming stage. It is optional to add antioxidants and fillers.

Polymer dispersion foams L are usually prepared by beating a compounded rubber dispersion to convert it to a flowable foam, introducing said foam into a mold, gelling it if desired, and then vulcanizing the foam. Foam rubber in accordance with the invention can therefore be prepared both by molding techniques, such as the Dunlop or Talalay processes, or by lateral spreading techniques. In such techniques, a molding foam is produced, for example, if the foam dispersion is cast in molds, optionally gelled and subsequently vulcanized.

In this context preference is given to the Dunlop process. A polymer dispersion mixture which has been compounded for vulcanizability is beaten to a stable foam, known as the prefoamed polymer dispersion, with a volume of from about 8 to 12 times that of the original polymer dispersion mixture. A solution of sensitizing compounds, referred to as gelling agents, is added to the foam, which is introduced into a closeable mold. Depending on the amount of sensitizer added the foam remains liquid for about 5 to 10 minutes before gelling. While still in the mold, it is vulcanized by heat treatment with steam or, for example, hot water. Shrinkage may take place in the course of subsequent washing and drying.

The process stages of foaming, gelling or curing, drying and crosslinking are known to the skilled worker in the same way as the products which can be used for these stages. Where gelling agents are used, they are suitably those of the heat-sensitive or delayed-action type. Typical examples of suitable such agents are well known and, like the processes in which they are commonly employed, are described in Madge's 'Latex Foam Rubber'. In general, the Dunlop process employs delayed-action gelling agents, while heat-sensitive agents are employed for lateral-spread foams and flat-rolled materials.

The invention also provides the polymer dispersion foams obtainable by the process described above. These include molding foams, which are obtainable by foaming an appropriate, coarse polymer dispersion G, as described above, as intermediate. Molding foams generally have a density of from 60 to 140 g/l, such as from about 90 to 120 g/l, for example. Their tear strength is generally at least 75 kPa, preferably at least 100 kPa. Their elongation at break is generally at least 100%, preferably at least 150%.

Polymer dispersion foams having the properties described above are of preferential suitability as molding foams for producing polymer dispersion mattresses, furniture upholstery and other foam moldings.

Also included among the polymer dispersion foams of the invention are the carpeting foams obtainable by foaming an appropriate coarse polymer dispersion G as intermediate. These foams generally have a density of from about 150 to 290 g/l, such as from 200 to 230 g/l, for example. Their tear strength is generally at least 70 kPa. The elongation at break of these foams is generally at least 100%.

Such polymer dispersion foams L are of preferential suitability for producing foamed carpet backings.

The invention is illustrated below by the following non-limiting examples.

EXAMPLES

The glass transition temperature Tg was determined by DSC (differential scanning calorimetry).

The surface tension (ST) was determined using a ring tensiometer.

The LT (light transmittance) was determined on a 0.01% strength by weight solution in water against pure solvent as reference.

The ponderal median particle diameters ($d_{50}$, $d_{90}$) were determined in accordance with W. Mächtle, Makromolekulare Chemie 185 (1984) 1025–1039 in an analytical ultracentrifuge (AUC).

The apparent viscosity was determined in a Brookfield viscometer (LV) at 25° C. and 30 rpm (ISO 1652).

The density of the polymer dispersion foams was determined in accordance with ISO 845.

The hardness of the polymer dispersion foams was determined as the indentation resistance in accordance with ISO 2439A for 40% indentation (30 s).

The tear strength and elongation at break were determined in accordance with ISO 1798 (tensile strength).

The shrinkage was determined in accordance with ISO 845.

The compression set was determined in accordance with ISO 1856.

A) Preparing a Fine Polymer Dispersion

A stirred polymerization pressure vessel with an internal volume of 160 l was charged at 20° C. with a solution of 0.18 kg of $K_2SO_4$, 0.11 kg of $Na_2SO_4$, 0.007 kg of the sodium salt of ethylenediaminetetraacetic acid, 0.007 kg of sodium dithionite, 0.17 kg of a polycondensate of naphthalene-sulfonic acid and formaldehyde having a number-average molecular weight of 5000 in the form of a 45% strength by weight aqueous solution, 7.9 kg of potassium oleate in the form of a 12.5% strength by weight aqueous solution and 9.0 kg of water, and then 46.8 kg of water were added. The following constituents of a redox initiator system were then added: 0.007 kg of sodium thionite, 0.007 kg of sodium formaldehyde-sulfoxylate, 0.003 kg of $Fe(II)SO_4.7H_2O$, 0.007 kg of the sodium salt of ethylenediaminetetraacetic acid, 0.013 kg of sodium phosphate ($Na_3PO_4.10H_2O$) and 2.5 kg of water. Then 8.4 kg of styrene and 0.03 kg of tert-dodecylmercaptan were incorporated with stirring. Finally, 25.1 kg of butadiene were injected into the polymerization vessel. The resulting mixture was cooled to 10° C. Then 0.05 kg of para-menthane hydroperoxide was added in one portion, so triggering the polymerization. While the polymerization temperature of 10° C. was maintained, polymerization was continued until a polymerization conversion—based on the overall amount of the monomers to be polymerized— of 35% by weight was reached. Then, in one portion, a further 1.3 kg of potassium oleate (as 12.5% strength by weight aqueous solution) and 0.02 kg of para-menthane hydroperoxide were added. Polymerization was then continued to a conversion of >70 and <90% by weight, still while maintaining the 10° C. Finally, the free-radical aqueous emulsion polymerization was stopped by addition of 0.012 kg of diethylhydroxylamine. The residual monomers were subsequently removed by stripping.

B) Pressure Agglomeration with Variation of the Solids Content

The physical properties of the polymer dispersion from Example A) which is employed for pressure agglomeration are set out in Table 1. The solids content of the dispersion is adjusted by conventional concentration techniques to 34.4% by weight (Example B1) and 39.3% by weight (Example B2). The resulting initial dispersions are subjected to pressure agglomeration under the conditions indicated in Table 1 (apparatus: high-pressure pump LAB 60-10 TBS from APV Gaulin GmbH).

The pressure-agglomerated aqueous polymer dispersions were concentrated under the same conditions using a thin-film evaporator to give coarse polymer dispersions having a solids content of 68.9% by weight (B1) and 72.0% by weight (B2). The jacket temperature of the thin-film evaporator varied from 100 to 130° C. The pressure within the evaporator varied from 80 to 120 mbar. The associated polymer dispersion temperature was 40 to 50° C. The physical properties of the agglomerated, coarse polymer dispersions are likewise set out in Table 1.

100 parts by weight, based on solid weight, of the coarse polymer dispersions B1 and B2 were mixed with in each case 23.5 parts by weight, based on solid weight, of a reinforcer dispersion which had been prepared from styrene and had an approximately monomodal particle size distribution. The following components were stirred in succession in to 1540 g of each of the resulting aqueous polymer dispersions:

45 g of sulfur as a 50% by weight aqueous suspension, 20 g of zinc ethylphenyldithiocarbamate as a 50% by weight aqueous suspension, and 15 g of diphenylguanidine as a 50% by weight aqueous suspension, 20 g of a 50% by weight aqueous suspension of a customary free-radical scavenger based on sterically hindered phenols;

60 g of finely divided ZnO as a 50% by weight aqueous suspension.

The resulting mixture was foamed to 8–10 times its volume using a foam beater. 120 g of $Na_2SiF_6$ (as a 25% by weight aqueous suspension) were incorporated into the resulting foam over 2 minutes. The beaten mass was subsequently introduced into a metal mold (450 mm×350 mm×50 mm) and the excess foam was scraped away to leave a smooth surface. The foam was left to gel (which took place in 10 minutes) at room temperature, and then vulcanized in a vulcanizing oven which was heated by means of steam at 100° C. (30 minutes). The resulting foam rubber was then removed from the mold, dried and conditioned in accordance with DIN EN 597 (draft of February 1992, Parts 1 and 2). The physical properties of the resulting molding foam B1 and of the carpeting foam B2 are likewise set out in Table 1.

TABLE 1

| Physical properties | | | B1 molding foam | B2 carpeting foam |
|---|---|---|---|---|
| Fine initial dispersion | Tg (DSC) | ° C. | −52.6 | −52.6 |
| | ST | mN/m | 64 | 64 |
| | LT | % | 91 | 91 |
| | $d_{50}$ (AUC) | nm | 51 | 51 |
| | $d_{90}$ (AUC) | nm | 94 | 94 |
| Agglomeration conditions | p | bar | 200 | 200 |
| | T | ° C. | 21 | 21 |
| | Throughput | l/h | 60 | 60 |
| | Solids content | % | 34.4 | 39.3 |
| Coarse polymer dispersion | Solids content | % | 68.9 | 72 |
| | Viscosity | mPa.s | 1560 | 1660 |
| | ST | mN/m | 33 | 35 |
| | LT | % | 12 | 6 |
| | $d_{50}$ (AUC) | nm | 305 | 580 |
| | $d_{90}$ (AUC) | nm | 830 | 1171 |
| Polymer dispersion foam comprising coarse dispersion and reinforcer | Density | g/l | 107 | 110 |
| | Hardness | N | 369 | 472 |
| | Tear strength | kPa | 105 | 82 |
| | Elongation at break | % | 225 | 110 |
| | Shrinkage | % | 19 | 24 |
| | Compression set | % | 13 | 21 |

C) Pressure Agglomeration with Variation in Temperature

The physical properties of the polymer dispersion from Example A) which was employed for pressure agglomeration are set out in Table 2. The solids content of both dispersions C1 and C2 is 37.9% by weight. The resulting dispersions are subjected to pressure agglomeration under the conditions indicated in Table 2 (apparatus as in Example B).

As in Example B, the pressure-agglomerated aqueous polymer dispersions are concentrated using a thin-film evaporator to a solids content of 71.9% by weight (Example C1) and 74.3% by weight (Example C2).

The physical properties of the agglomerated, coarse polymer dispersions are likewise set out in Table 2.

In the same way as in Example B, the coarse polymer dispersions were mixed with a reinforcer and processed to polymer dispersion foams. The physical properties of the resultant molding foam C1 and of the carpeting foam C2 are likewise set out in Table 2.

TABLE 2

| Physical properties | | | B1 molding foam | B2 carpeting foam |
|---|---|---|---|---|
| Fine initial dispersion | Tg (DSC) | ° C. | −53.0 | −53.0 |
| | ST | mN/m | 64 | 64 |
| | LT | % | 89 | 89 |
| | $d_{50}$ (AUC) | nm | 51 | 51 |
| | $d_{90}$ (AUC) | nm | 115 | 115 |
| Agglomeration conditions | p | bar | 225 | 225 |
| | T | ° C. | 24.5 | 16.5 |
| | Throughput | l/h | 60 | 60 |
| | Solids content | % | 37.9 | 37.9 |
| Coarse polymer dispersion | Solids content | % | 71.9 | 74.3 |
| | Viscosity | mPa.s | 7700 | 6300 |
| | ST | mN/m | 37 | 34 |
| | LT | % | 3 | 3 |
| | $d_{50}$ (AUC) | nm | 610 | 731 |
| | $d_{90}$ (AUC) | nm | 1164 | 1591 |
| Polymer dispersion foam comprising coarse dispersion and reinforcer | Density | g/l | 110 | 112 |
| | Hardness | N | 391 | 473 |
| | Tear strength | kPa | 83 | 74 |
| | Elongation at break | % | 125 | 100 |
| | Shrinkage | % | 25 | 25 |
| | Compression set | % | 15 | 17 |

As shown by Examples B and C of the invention, coarse dispersions with different average particle sizes and particle-size distribution can be obtained by varying one parameter in the pressure agglomeration (fine dispersion solids content or agglomeration temperature) of an initial dispersion A. This is demonstrated by the $d_{50}$ and $d_{90}$ values for the coarse dispersions of Tables 1 and 2. These coarse polymer dispersions can then be processed further under analogous conditions to give polymer dispersion foams having different properties, according to the respective requirements of a molding foam or a carpeting foam.

We claim:

1. A process for preparing a polymer dispersion foam L, where:

a) a mixture M which comprises at least one conjugated diene monomer A and at least one ethylenically unsaturated comonomer B is polymerized by free-radical aqueous emulsion polymerization in the presence of at least one emulsifier to give a fine polymer dispersion P, b) the fine polymer dispersion P is pressure-agglomerated to give a coarse polymer dispersion G, c) the polymer dispersion G is concentrated, optionally, and is mixed, optionally, with a reinforcer dispersion H, and d) the dispersion from c) is foamed to give a polymer dispersion foam L, which comprises adjusting the average particle size and the particle size distribution of G by varying a parameter selected from:

I) the solids content of P,
   II) the agglomeration temperature in step b),
   III) the agglomeration pressure in step b),
   IV) the content of comonomer B in the mixture M,
   V) the concentration of the emulsifier in P,
   VI) the agglomeration throughput.

2. A process as claimed in claim 1, wherein a polymer dispersion P having approximately monomodal particle size distribution is employed.

3. A process as claimed in claim 1, wherein the diene monomer A is selected from butadiene, isoprene, chloroprene and mixtures thereof.

4. A process as claimed in claim 1, wherein the ethylenically unsaturated comonomer B is selected from vinylaromatic compounds, esters of $\alpha,\beta$-ethylenically unsaturated $C_3$–$C_6$-mono- and dicarboxylic acids, $\alpha,\beta$-ethylenically unsaturated nitriles, esters of vinyl alcohol with $C_1$–$C_{20}$ monocarboxylic acids, $\alpha,\beta$-ethylenically unsaturated $C_3$–$C_6$ mono- and dicarboxylic acids and their amides, N-alkylolamides of $\alpha,\beta$-unsaturated $C_3$–$C_{10}$ carboxylic acids and their esters with $C_1$–$C_4$ alcohols, hydroxyalkyl acrylates, hydroxyalkyl methacrylates and mixtures thereof.

5. A process as claimed in claim 1, wherein the amount of the diene monomer A is from 45 to 99% by weight, based on the amount of the monomers of M.

6. A process as claimed in claim 1, wherein the amount of the diene monomer A is from 50 to 90% by weight, based on the amount of the monomers of M.

7. A process as claimed in claim 1, wherein the amount of the diene monomer A is from 55 to 85% by weight, based on the amount of the monomers of M.

8. A process as claimed in claim 1, wherein agglomeration b) is carried out using a polymer dispersion P having a solids content of from 30 to 55% by weight.

9. A process as claimed in claim 1, wherein aggomeration b) is carried out using a polymer dispersion P having a solids content of from 32 to 45%.

10. A process as claimed in claim 1, wherein the agglomeration temperature in step b) for preparing a polymer dispersion G for further processing to a molding foam is from 5 to 40° C., or for further processing to a carpeting foam is from 5 to 35° C.

11. A process as claimed in claim 1, wherein the agglomeration temperature in step b) for preparing a polymer dispersion G for further processing to a molding foam is from 15 to 40° C., or for further processing to a carpeting foam is from 5 to 30° C.

12. A process as claimed in claim 1, wherein the content of comonomer B in the mixture M for preparing a polymer dispersion G for further processing to a molding foam is from 10 to 40% by weight and for further processing to a carpeting foam is from 15 to 55% by weight.

13. A process as claimed in claim 1, wherein the content of comonomer B in the mixture M for preparing a polymer dispersion G for further processing to a molding foam is from 10 to 35% by weight and for further processing to a carpeting foam is from 20 to 55% by weight.

14. A process as claimed in any of the preceding claims, wherein the solids content of the polymer dispersion P for further processing to a molding foam is from 30 to 55% by weight and for further processing to a carpeting foam is from 30 to 55% by weight.

15. A process as claimed in claim 1, wherein the solids content of the polymer dispersion P for further processing to a molding foam is from 30 to 40% by weight and for further processing to a carpeting foam is from 35 to 55% by weight.

* * * * *

UNITED STATES PATENT AND TRADEMARK OFFICE
CERTIFICATE OF CORRECTION

PATENT NO. : 6,051,616
DATED : April 18, 2000
INVENTOR(S) : Roelof Balk, et al.

It is certified that error appears in the above-identified patent and that said Letters Patent is hereby corrected as shown below:

Column 5,
Line 46 "comopunds," should read -- compounds, --.

Column 8,
Line 54 "agglothration" should read -- agglomeration --.

Column 15,
Line 29, "aggomeration" should read -- agglomeration --.

Signed and Sealed this

Twenty-third Day of October, 2001

Attest:

NICHOLAS P. GODICI
Attesting Officer    Acting Director of the United States Patent and Trademark Office